(12) United States Patent
Boschung, Jr. et al.

(10) Patent No.: US 6,326,893 B1
(45) Date of Patent: Dec. 4, 2001

(54) PROCESS AND WARNING DEVICE FOR PRODUCING AN EARLY WARNING SIGNAL OF SLICK ROAD CONDITIONS

(75) Inventors: Marcel Boschung, Jr., Neyruz; Joachim Heierlj, Avenches, both of (CH)

(73) Assignee: Boschung Mecatronic AG, Granges-Paccot (CH)

(*) Notice: Subject to any disclaimer, the term of this patent is extended or adjusted under 35 U.S.C. 154(b) by 0 days.

(21) Appl. No.: 09/403,027

(22) PCT Filed: Jun. 3, 1999

(86) PCT No.: PCT/IB99/00999

§ 371 Date: Nov. 17, 1999

§ 102(e) Date: Nov. 17, 1999

(87) PCT Pub. No.: WO00/75896

PCT Pub. Date: Dec. 14, 2000

(51) Int. Cl.[7] .................................................. G01W 1/00
(52) U.S. Cl. ......................... 340/601; 340/602; 340/905; 702/3
(58) Field of Search .................. 340/601, 539, 340/506, 511, 586, 602, 905; 250/338.1, 338.5, 341.8; 702/3, 4–5; 342/26; 455/404, 456

(56) References Cited

U.S. PATENT DOCUMENTS

| | | | |
|---|---|---|---|
| 3,596,264 | * 7/1971 | Ciemochowski | 340/601 |
| 4,851,817 | * 7/1989 | Brossia | 340/583 |
| 5,663,710 | * 9/1997 | Fasig | 340/601 |
| 5,850,619 | 12/1998 | Rasmussen et al. | |
| 5,982,288 | * 11/1999 | Sawatari | 340/601 |
| 6,046,674 | * 4/2000 | Irwin | 340/539 |
| 6,112,074 | * 8/2000 | Pinder | 455/404 |

FOREIGN PATENT DOCUMENTS 292639  11/1988 (EP).
97/18442  5/1997 (WO).

OTHER PUBLICATIONS

Nefzger et al., "Einfluss von Strahlung und Mikroklima auf Strassenwetterprognosen", Bunderesministerium für wirtschalftliche Strassenforschung, No. 446, Part 3 (Energiebilanzmodell zur Prognose der Fahrbahnoberflächentemperatur) (1997).

Funcken et al., "Thermographie Routiere Nocturne de la Region Wallonne: Methodologie et Presentation des Resultats, interet de L'Approche Topoclimatologique", Laboratoire de Climatologie at de Topoclimataologie (1998).

Grell et al., "A Description of the Fifth–Generation Penn State/NCAR Mesoscale Model (MM5)," NCAR Technical Note—NCAT/TN-398 + Str, XP002132234 (Jun. 1995), and retrieved from <URL:http//www.mmm.ucar.edu/mm5/mmm5-home.html> on Feb. 25, 2000.

Shao et al., "An Automated Nowcasting Model for Road Surface Temperature and State for Winter Road Maintenance," Journal of Applied Meteorology, vol. 35, No. 8, XP–000884600, ISSN: 0894–8763, pp. 1352–1361 (Aug. 1996).

\* cited by examiner

Primary Examiner—Jeffery Hofsass
Assistant Examiner—Anh La
(74) Attorney, Agent, or Firm—Greenblum & Bernstein, P.L.C.

(57) ABSTRACT

For transmitting early warning signals of slick road conditions (1, 2, 3, 4), in addition to automatic measuring stations (AMS1–AMS5) that have probes for the weather conditions and the freezing point of liquid present on the road, virtual stations (VS1–VS 11) are created and used for which weather data, freezing point data, and parameters are taken from the automatic measuring stations in order to transmit an early warning of slick conditions for the virtual stations also, by means of an evaluating device (5).

20 Claims, 4 Drawing Sheets

PYRRADIOMETER

QS ~ 0
QL ~ 0
QD ~ 0

QG + QIR MEASURED

ROAD

QS ⎫
QL ⎬ CALCULATED
QD ⎭

TB } MEASURED

QIR + QG OPTIMIZED BY MEANS OF COMPARISON
TB (MEASURED) - TB (CALCULATED)

PROCESS AND WARNING DEVICE FOR PRODUCING AN EARLY WARNING SIGNAL OF SLICK ROAD CONDITIONS

CROSS-REFERENCE TO RELATED APPLICATIONS

The present application is a U.S. National Stage of International Application No. PCT/IB99/00999 filed Jun. 3, 1999.

BACKGROUND OF THE INVENTION

1. Field of the Invention

The invention relates to a process for producing an early warning signal of slick conditions in a system for easy warning of slick road conditions as well as a process for the provision of at least one virtual measuring station in a system for early warning of slick road conditions. The invention further relates to a warning device for slick road conditions having at least one, automatic measuring station and at least one evaluating device as well as a process and a warning device for slick road conditions.

2. Discussion of the Background Information

Early warning of slick conditions is understood to mean the short-term forecast of icing on roads and bridges. The purpose of this early warning is the specific preventive use of the "scattering" service or automatic melting agent spray apparatus for avoiding hazardous road conditions.

Currently, the early warning of slick conditions is carried out for predetermined points in the road system at which measuring stations with active or passive probes are provided, which stations detect the initial formation of slick conditions. Thus, probes are provided in particular for the air temperature, the ground temperature, the moisture on the roadway, and the precipitation, as well as probes for the freezing temperature of the liquid present on the roadway. The readings of the probes are transmitted to an evaluating device that derives an alarm announcement from the measured values. The early warnings of slick conditions are thus limited to short selected sections of the road on which the measuring stations are arranged. An extension of the early warning of slick conditions to more sections of the road requires the installation of more measuring stations, such that reasons of cost hinder the per se desirable extensive coverage of the road system with measuring stations. It has therefore been proposed to achieve a broad-coverage early warning of slick conditions by recording information on the entire road system by thermography and to derive an early warning of slick conditions therefrom. In order to achieve broad-coverage early warning of slick conditions, the surface temperature of the road surface is thermographed in the entire road system on three different nights with different weather conditions. This yields three characteristic temperature profiles that show "cold" or "warn" sections of the road. These profiles are invoked for spatial interpolation of the present state of the roads outside the measuring station. This method has disadvantages. First, the number of temperature profiles is not nearly sufficient to cover all weather situations and times of day, which is tantamount to a coarse simplification of the interpolation, which can lead to loss of information throughout. Secondly, the dynamics of heat and moisture exchange are not taken into consideration, since each thermal cartogram is necessarily a snapshot of the road conditions. The danger of slick conditions on a road section, however, depends on the previous weather conditions.

SUMMARY OF THE INVENTION

The present invention provides a process by which an extensive recording of information on the road system and an accurate early warning of slick conditions is possible at low cost.

According to the present invention, at least one virtual measuring station is operated for which an early signal of slick conditions can be produced.

By creating simulated or "virtual" measuring stations at any desired predetermined points in the road system, the coverage of the road system can be increased so appreciably that virtually complete recording is possible without great expenditure on apparatus. The virtual measuring stations are provided thereby with measurement data from real measuring stations (which does not, however, exclude the possibility of also equipping such a simulated measuring station with a probe actually present at the predetermined point) and have a site-specific set of parameters. The simulated measuring station can be formed thereby in the evaluating device or in a separate circuit.

The present invention furthermore provides create a process for providing such virtual measuring stations. In this regard, the site of the virtual measuring station in the road system is stipulated, and a determination is made about which meteorological data from which meteorological measuring stations are assigned to the virtual measuring station. Further, specific parameters are assigned to the virtual measuring station features of claim 10.

The present invention furthermore provides create a device for early warning of slick road conditions in which the broadest possible coverage of the road system is possible with a low expenditure on equipment.

A device for early warning of slick road conditions includes at least one virtual measuring station which is provided for producing an early warning signal of slick conditions.

A process and a device for early warning of slick road conditions are furthermore provided which that allow the degree of cloud cover to be determined in as low-maintenance and cost-effective a manner as possible.

BRIEF DESCRIPTION OF THE DRAWINGS

This is achieved according to claims 9 and/or 18.

Examples of the invention are explained in more detail below on the basis of the drawings.

DETAILED DESCRIPTION OF THE PRESENT INVENTION

Figure 1:
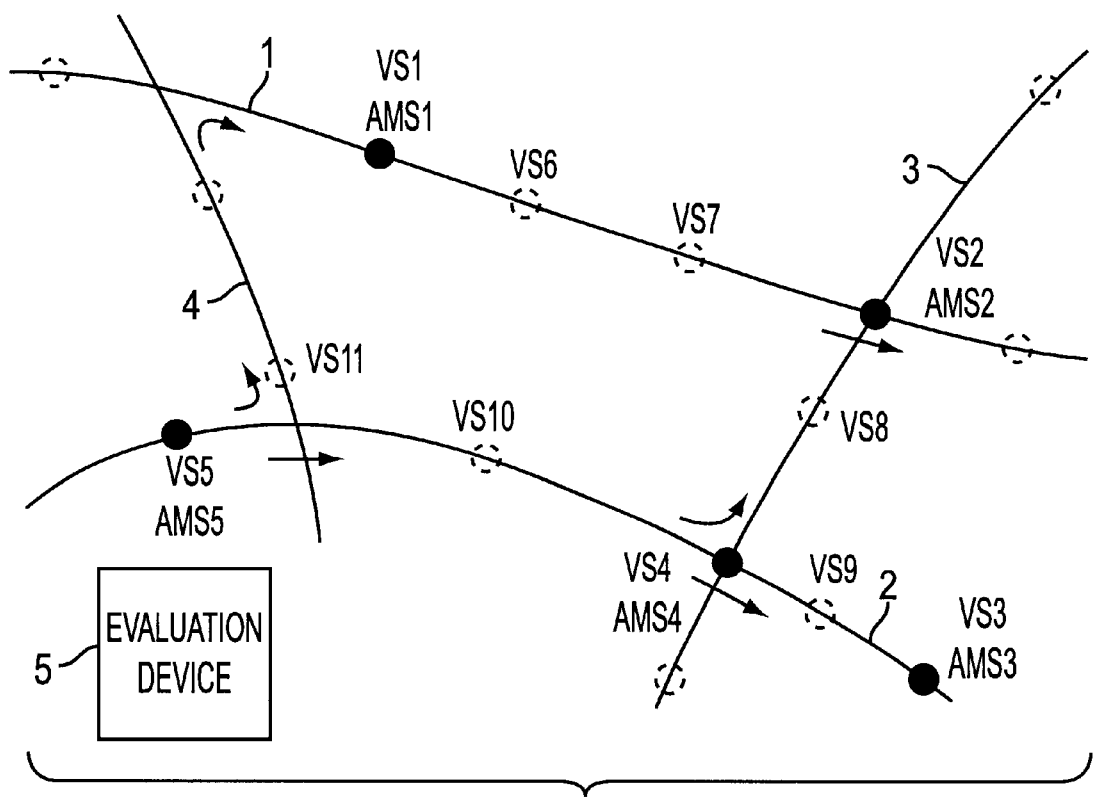
FIG. 1 shows a schematic partial view of a road system with the position of real and virtual measuring stations.

The procedure for forming a virtual measuring station and its operation are explained in greater detail below. FIG. 1 shows thereby schematically several roads 1, 2, 3, 4, of a road system, as well as an evaluating device 5 shown by a box-shaped symbol. Evaluation device 5 can be located, e.g., in a yard of the highway maintenance service and is formed, e.g., by a computer and interface circuits to connect the computer to the individual measuring stations. The computer is designed to send an early warning signal of slick conditions, and together with the measuring stations and the interface circuits, forms the system for early warning of slick conditions (GFS). Several conventional automatic measuring stations (AMS) as AMS1 to AMS5 are shown symbolically in the figure as dots in the road system. Such automatic measuring stations are known in principle and are not shown here in detail. They include, e.g., probes for air temperature, ground temperature, moisture on the roadway, precipitation, relative humidity or dew point, freezing temperature, air speed, air pressure, and amount of traffic. The individual probes are arranged thereby, e.g., on masts or in the surface of the roadway and are not described further here, since they are known. The probe data are sent to the evaluating device via electric wires or radio. This device can produce an early warning signal of slick conditions from these data for the corresponding measuring site, which is used as a signal for an entire section of road. According to the invention at least one virtual or simulated measuring station (VS) is now provided, where the virtual measuring stations VS1 to VS11 in FIG. 1 are drawn in as an example. As a rule, these virtual measuring stations have no probes, which does not, however, preclude the possibility of a probe being present for one of the measured values. However, the probe equipment of an automatic measuring station AMS is not present. Since no probes are provided in the virtual measuring stations, they also do not have any physical connection between the site of the virtual station and the evaluating device 5, but are recorded in this (or in another circuit or device) as virtual stations. Virtual stations can also be provided at the same sites at which automatic measuring stations are present, as is explained in more detail below; in FIG. 1 this is shown for AMS1/VS1, AMS4/VS4, and AMS5/VS5 as an example. Since the virtual stations can be operated as a rule without expenditure for apparatus on the street and without a connection to the evaluating device, they are cost-effective and can therefore be provided in the road system in large numbers, so that a broad-coverage monitoring of the road system can be effected. The arrangement of the road system in sectors having a virtual station or their placement can be determined according to the results of experiments to locate places in danger of slick conditions or, e.g., by means of thermography.

The chief component of each virtual station is a program that accesses the measurement data of adjacent automatic measuring stations and contains or accesses parameters specific to the site of the respective virtual measuring station. A number of automatic measuring stations AMS are therefore needed as a rule in order to be able to set up and operate a system for early warning of slick conditions with virtual measuring stations.

To set up the virtual stations, first the automatic measuring stations are selected that are suited to the collection of all the necessary information (measured data and parameters) for the virtual stations. The different types of construction in the road system are thereby taken into consideration (e.g., road surfaces with various material properties, where each type of construction is to be represented by an automatic measuring station, so that after they have been determined, the parameters of this type of construction can be used for the virtual stations at sites with the same road surface construction. Furthermore, the section of road over which the melting agents are scattered must be taken into consideration. At least one automatic measuring station should be present per scattering section. In FIG. 1, the scattering sections are shown as arrows starting from the highway maintenance yard at AMS5.

The preferred weather data gathered for early warning of slick conditions are the type and amount of precipitation, air temperature, cloud cover, dew point, and wind strength. These data are first gathered at certain points by the meteorological GFS measuring network, i.e. a corresponding set of data is available in the GFS network for each automatic measuring station. Each virtual station also needs its set of meteorological data. This can be taken simply from an adjacent automatic measuring station similarly situated as far as the meteorological data are concerned, without change. Thus, e.g., the set of meteorological data of the automatic measuring station AMS1 could likewise be used for the virtual station VS6. This is done, e.g., such that the evaluating device 5 contains the information that the meteorological data sent by AMS1 are also valid for VS1. In order to obtain a more accurate set of weather data for each VS station, these data can be determined as a function of the weather data of several automatic measuring stations (or even virtual stations), e.g.,: value (station VS6)=function (value (station AMS1, station AMS2 . . . )). For example, the value of the air temperature of VS6 is determined as a function of the value of the air temperature of AMS1 and AMS2. The same procedure is followed for the precipitation, dew point, cloud cover, and wind speed values. Linear or polynomial regressions are suitable as functions. This adoption of weather data for a different site must of course be satisfactory, but need not be perfect.

The formation of each virtual station furthermore includes a parametrization in which parameters applying to the station, e.g., road surface properties, course of the horizon, are assigned to the station. Certain parameters can be taken thereby from measuring stations that have the same construction. For example, the properties of the road surface at a certain virtual station can be taken from a measuring station AMS that has the same road surface. Not all parameters can be determined in this way: the horizon, the visible portion of the sky, and the type of road surface, cannot, for example. These data must be ascertained individually at each virtual station. The horizon, for example, is determined by photography or manual measurement. How successfully the virtual station detects the actual conditions depends on the accuracy of the parametrization. In difficult cases, a mobile measuring station can be made available temporarily, e.g., for two weeks, at the site of the virtual station at any time, in order to optimize the parametrization.

The following table shows the parameters of a virtual station.

01 Text Name of the virtual station (VS)
02 # Identifier of the VS
03 # Pertinent climatic zone
04 # AMS source for climatic data
05 # AMS source for type of road surface
06 # AMS source for freezing temperature or salt content (last MAS before VS on the scattering route)
07 deg or rad Degree of longitude
08 deg or rad Degree of latitude
09 m Height above sea level
10 0, 1, 2 Roadway edge type (0: earth, 1: low bridge, 2: high bridge)
11 deg or rad Average horizontal angle in the E-SE sector
12 deg or rad Average horizontal angle in the S-SE sector
13 deg or rad Average horizontal angle in the S-SW sector
14 deg or rad Average horizontal angle in the W-SW sector
15 0.5–1.3 Local wind factor compared with open location
16 # Identifier of the air pressure reference station in the GFS system
17 0–100% Infrared emissivity of the roadway
18 0–100% Albedo of the roadway
19 m Width of the roadway
20 0–100% Visible portion of the celestial hemisphere in %
21 kg/m$^3$ Material density of the road surface (layer 0)

Figure 2:
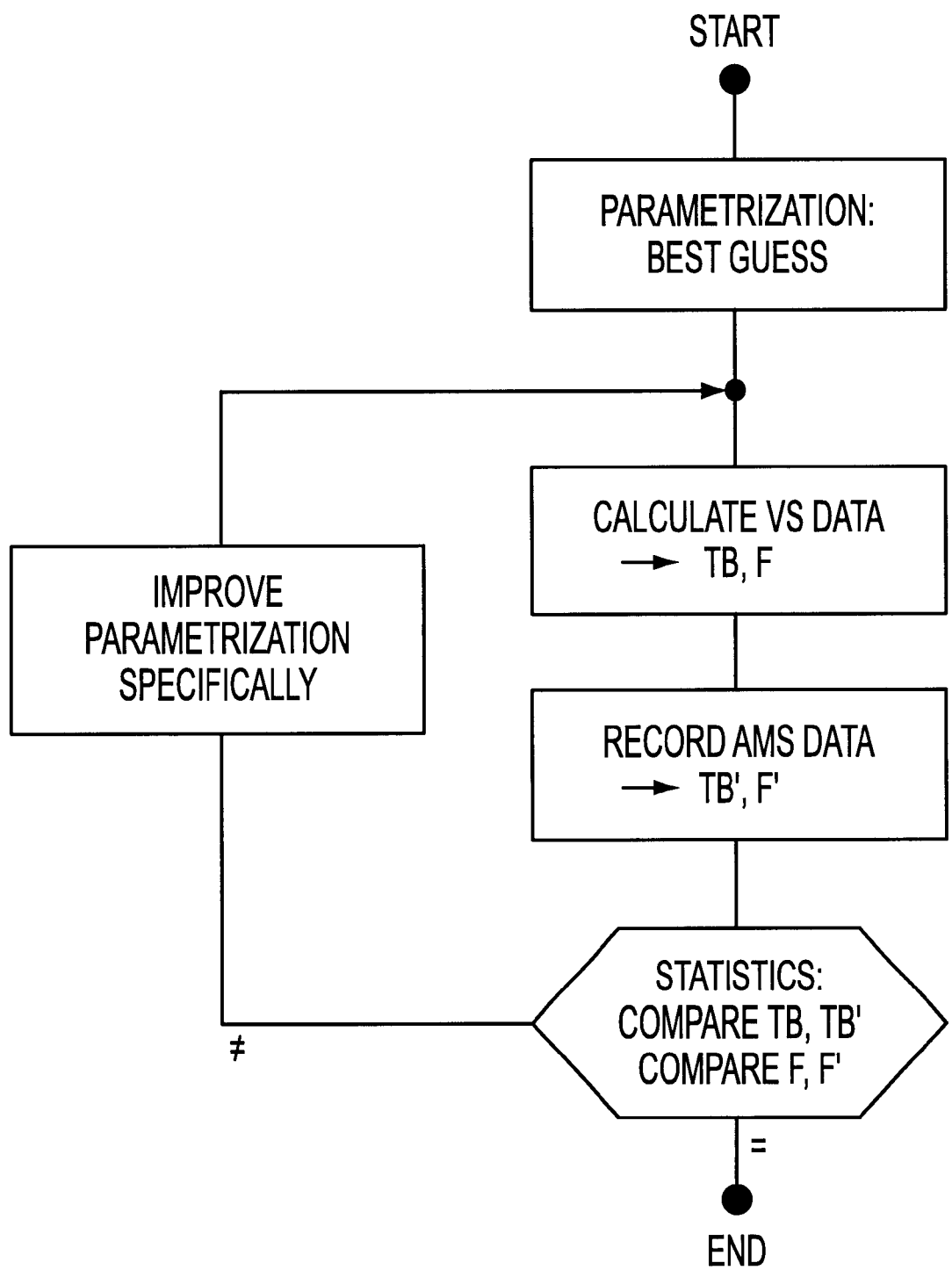
FIG. 2 shows a flow diagram for the parametrization of the measuring stations.

22 kg/m³ Material density of layer 1
23 kg/m³ Material density of layer 2
24 kg/M³ Material density of layer 3
25 J/kg/K Specific heat capacity of the road surface (layer 0)
26 J/kg/K Specific heat capacity of layer 1
27 J/kg/K Specific heat capacity of layer 2
28 J/kg/K Specific heat capacity of layer 3
29 W/m/K Thermal conductivity of the road surface (layer 0)
30 W/m/K Thermal conductivity of layer 1
31 W/m/K Thermal conductivity of layer 2
32 W/m/K Thermal conductivity of layer 3
33 m Depth of the upper boundary of layer 1
34 m Depth of the upper boundary of layer 2
35 m Depth of the upper boundary of layer 3
36 m Total depth of the roadway for the calculation
37 # Type of road surface As stated, parameters can be used simply on the basis of the position of the virtual station, e.g., roadway edge type (parameter 10) and material density of the road surface (parameters 21–24) or can be ascertained, e.g., parameters 11–14. Other parameters, e.g., the reflectance value of the road surface (parameters 17, 18) or the heat capacity of the road surface (parameters 25–28) are preferably ascertained and optimized by also forming virtual stations in places at which automatic measuring stations are present and deriving the parameters to be determined from measured values of the automatic measuring station, where the parameters are first assumed roughly ("best guess") and then with these parameters and the meteorological data taken from the automatic measuring station, the quantities required for warning of slick conditions are calculated. By comparing these with the quantities measured by the probes of the automatic measuring station, the parameters can then be improved and the improved parameters can be used as the basis for a repeated calculation. FIG. 2 shows the corresponding course, in which the values of the quantities TB (temperature of the road surface) and F (road surface moisture) are calculated for the virtual station and are compared with the values of the quantities TB and F of the automatic measuring station, which has a road surface temperature probe and a road surface moisture probe, which enables the entire parametrization of the measuring point to be optimized. Two further examples: the optimum reflectance value of the road surface is determined on good-weather days based on the range of road surface temperatures. The heat capacity of the road surface is found by analyzing a phase shift of the road surface temperature, etc. If measured values are available, these are used, of course. The goal is the maximum agreement of the results of the virtual station with the measured data of the same station.

Both the parameters and the meteorological data are now available for the virtual stations.

To produce an early warning signal of slick conditions, it is also necessary to know the freezing temperature of the liquid present on the road which, in the conditions leading to an early warning of slick conditions, is an aqueous melting agent solution, as a rule. Special freezing point probes that cool a sample of the liquid and determine its freezing temperature, are provided in the roadway for this purpose in the automatic measuring stations; this is known and is not explained here in greater detail.

As a rule, no probe is available at the site of the virtual station to determine the freezing temperature, however, so that the freezing temperature is determined in a different way in the virtual stations, in which the following two determination methods can be used individually (or else in combination): the one method is based on taking the measured freezing temperature from a measuring station with a probe that lies on the same scattering section as the virtual station concerned. Thus, e.g., for virtual station VS6 the measured freezing temperature can be taken from the automatic measuring station AMS1, after the melting agent scattering truck has passed the AMS1 station. The freezing temperature of AMS2 could also be used, but then it would be necessary to wait until the scattering truck had passed this point.

In the second method, the starting point is the scattering truck, which records the scattering site, e.g., by a GPS devise, and amount of melting agent scattered. Such scattering trucks are known (e.g., Boschung BoSat System). On the one hand, at each use of melting agent the current amount of melting agent scattered is recorded by the Boschung BoSat System (or another mobile measuring apparatus) and is fed to the data bank or evaluating device 5. It is recorded, e.g., that 10g/m² of NaCl were scattered from VS6 to VS7. On the other hand, the virtual station constantly calculates the hydric balance (see next section) and thus determines the current amount of water per square meter of roadway. Therefore, each use of melting agent gives a fixed point for the salt concentration. Until the next application, the dilution of the salt solution caused by additional precipitation and washing-away or evaporation is calculated. The prerequisite is a quantified datum of the amount of precipitation at the measuring stations, for which probes are present in the AMS whose measured values can be used for virtual stations.

The calculation of the amount of water on the roadway and the freezing temperature is based on the following equation (hydric balance on the surface of the roadway):

$$dm/dt = p(t) + l(m, \ldots) + a(m) + d(m, \ldots) \ [kg/s/m^2]$$

where:

m is the quantity of water on the roadway (kg/m²), p(t) is the rate of precipitation, excluding $l(m, \ldots)$, l(m, TL, TB,RF) is the rate of precipitation by condensation and evaporation alone, a(m) is the absorption of the water by the roadway, and d(m, traffic) is the runoff rate of the water.

The quotient $m/(m+p(t)+l(m, \ldots))$ determines the present dilution of the scattered salt on the roadway, and $d(m, \ldots)/m$ expresses the loss of salt from the roadway. The freezing temperature is associated with the concentration of the aqueous solution on the roadway (phase diagram of the scattered salt or Raoult's Law at low concentrations).

Figure 3:
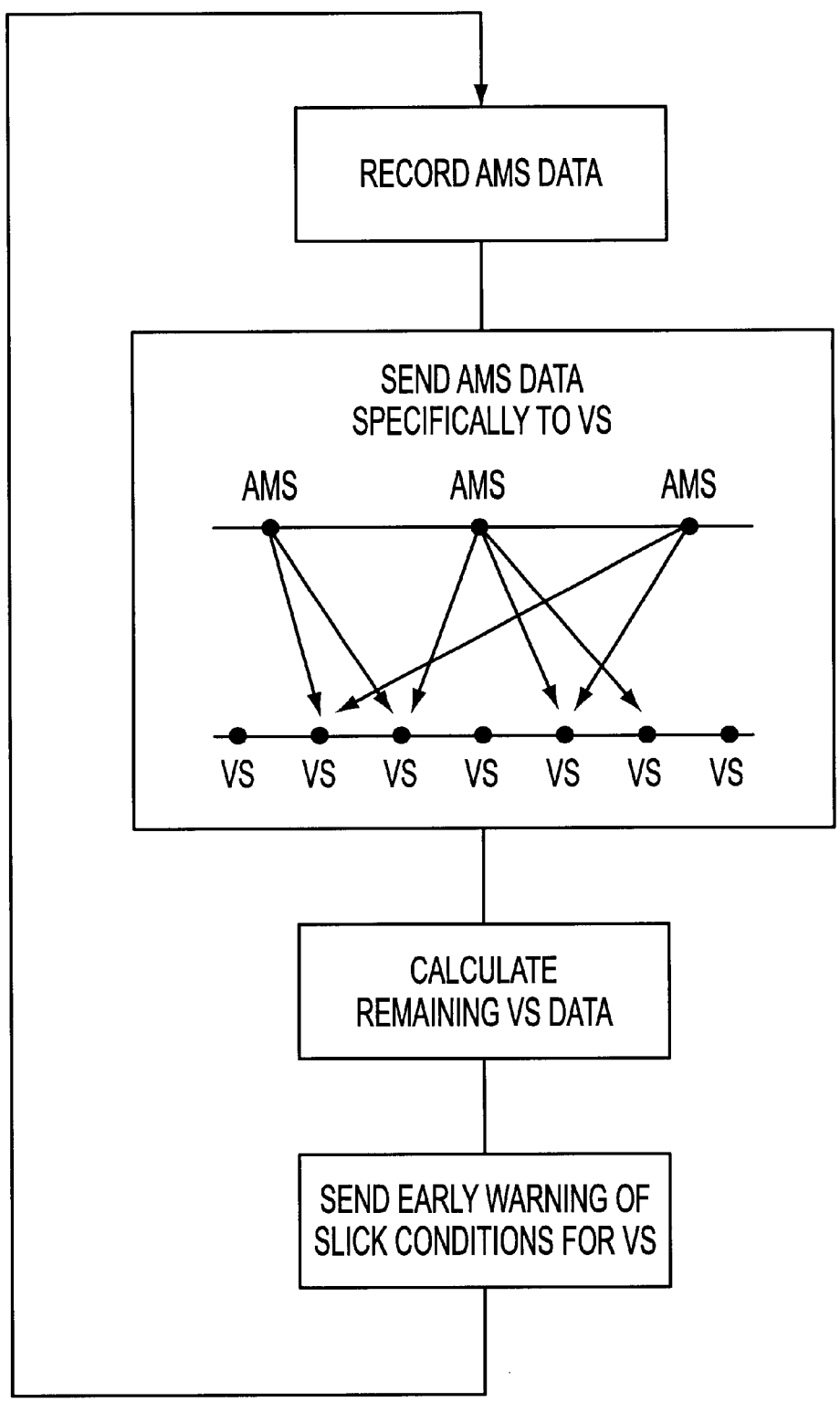
FIG. 3 shows a flow diagram for the formation of the early warning of slick conditions of a virtual measuring station.

All the necessary data are now available for each virtual station. The thermal calculation can begin. Instead of describing the method here explicitly, reference is made here to a publication that describes such a method. The described method or any other could be used, as long as it meets the same claims for accuracy. The calculation process must therefore take all essential physical processes into consideration. Whether this is a physical, statistical, or other method is not important. The goal of the calculation called the "virtual station" is an early warning of slick conditions. This includes data on the temperature of the road surface and the moisture on the road surface, from which the condition of the road and the icing alarms can logically be derived. The calculation should be carried out at intervals of 6 to 15 minutes. FIG. 3 shows schematically the calculation procedure that leads to a warning of slick conditions or not, depending on the result.

For the thermal calculation, reference is made thereby to the publication by H. Nefzger, A. Karpot., *Einfluss von*

*Strahlung und Mikroklima auf Strassenwetterprognosen* [Influence of Radiation and Microclimate on Road Weather Forecasts], Bundesministerium für wirtschaftliche Strassenforschung [Federal Ministry for Commercial Road Research], No. 466, and in particular to Part 3 (*Energiebilanzmodell zur Prognose der Fahrbahnoberflächentemperatur*[Energy Balance Model for Forecasting the Surface Temperature of the Roadway] with equations (11) to (19), which part is hereby included in this application in order to serve as an example for a possible thermal calculation.

The data monitoring of the virtual stations takes place as follows. With the Boschung BoSat System (or another mobile measuring apparatus), various conditions of the roadway are detected by probes mounted on the vehicles of the highway maintenance crews and/or police: e.g., temperature of the air and road surface, atmospheric humidity, and freezing temperature. These data can be measured on an irregular basis when passing the sites of the virtual stations. This gives a measuring point for each one that allows cross-comparison with the current calculation data of the virtual station. The concept of a "virtual station" yields the following advantages compared with the thermography method. Firstly, the process dynamics are maintained. The data bank forms the memory of the system, and the calculating process translates it into action. Each weather situation is automatically included in the calculation. Secondly, the process can be used at any desired sites. The prerequisite is communication with any desired meteorological measuring network, such as, e.g., the GFS measuring network, which has been described in the previous description as a provider of meteorological data. The meteorological data can also be delivered by a different measuring network, however, e.g., the ANETZ of the SMA (Schweizerische Meteorologische Anstalt [Swiss Meteorological Institute]). Thirdly, no relevant streams of heat and moisture are ignored. In particular, the hydric balance can be taken into consideration to the full extent in the calculation model. Fourthly, a virtual station is, of course, more cost-effective than a measuring station, since it is composed chiefly or exclusively of software.

The accuracy of a virtual station may at first appear lower than that of thermography, since the latter measures the three temperature profiles with high resolution and accuracy. It is worth considering, however, that these profiles are merely a snapshot that reflect a quite specific weather situation, time of day, temperature, and previous road and weather conditions. Therefore, they are not well-suited for an interpolation under all conditions. A substantial loss in accuracy must therefore be taken into account. The virtual station can compensate for this, owing to its flexible calculation.

Figure 4A:
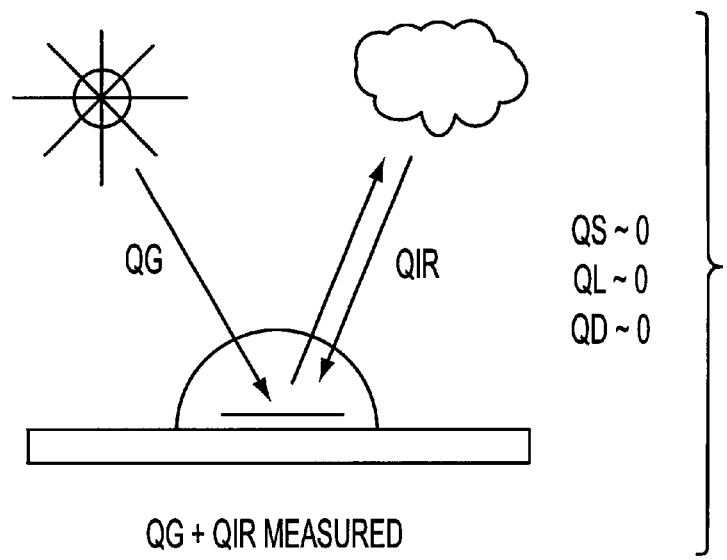
FIGS. 4a and 4b show schematically a pyrradiometer or a section of road used to determine the cloud cover.
Figure 4B:
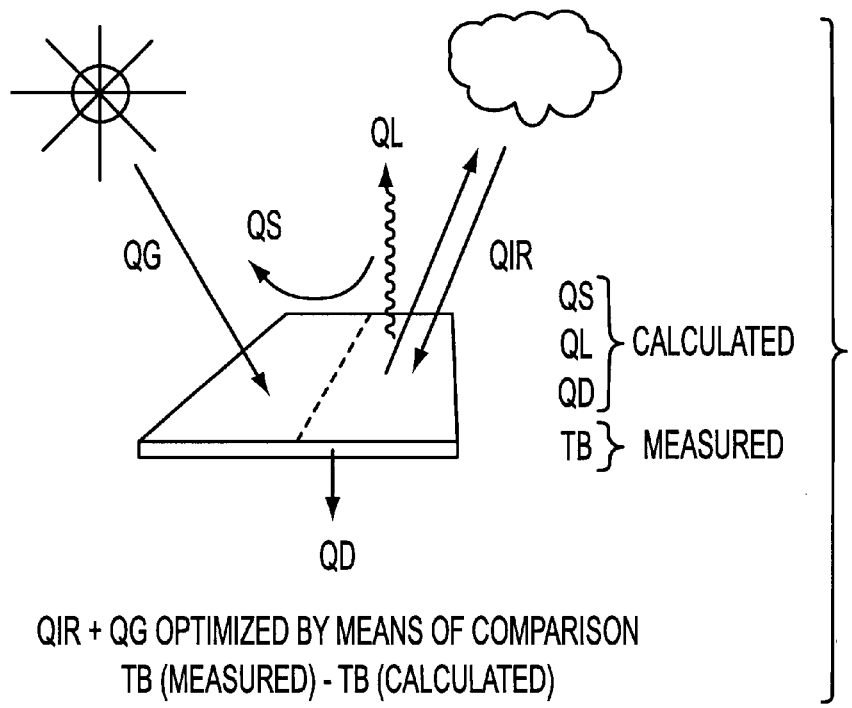

A further aspect of the invention concerns the detection of cloud cover, which is included in the thermal balance calculation according to equation (11). Detection of the cloud cover requires either human observation or the use of a measuring instrument for determining the infrared radiation balance (pyrradiometer). These instruments are susceptible to soiling, however, and are expensive to maintain. Their use in roadway measuring networks is therefore not preferred. Instead, the road itself can be used as a substitute pyrradiometer: the road surface temperatures are calculated with various assumed degrees of cloud cover in an approximation method, until they agree with the measured road surface temperatures. This degree of cloud cover is then interpreted as the current measured value and is stored in the data bank. FIGS. 4a and 4b show schematically, on the one hand, a known pyrradiometer, by means of which the global radiation QG (0.3–3.0 μm) and the infrared radiation QIR (3.0–50 μm) are measured; in the pyrradiometer the latent heat flow (condensation, evaporation, etc.) QL, the sensory heat flow (convection, wind) QS, and the heat conduction within the road (diffusion) are assumed to be zero. When the road is used as a pyrradiometer, QL, QS, and QD are detected by computer and QIR+QG are optimized by comparing the calculated road surface temperature TB (measured) with the measured road surface temperature (computer); the prevailing cloud cover is deduced from QIR and QG.

What is claimed is:

1. A process for producing an early warning signal of slick road conditions in a system for early warning of slick road conditions that includes at least one measuring station with probes arranged at at least one measuring point of a road system to be monitored, the process comprising:

virtually creating at least one virtual station, which is defined at at least one other point in the road system to be monitored that is different from the at least one measuring point, the virtual station being assigned location specific parameters related to the at least one other point and meteorological data related to the at least one other point;

calculating values indicative of slickness of the road surface at the at least one other point based upon the location specific parameters and the meteorological data related to the at least one other point; and producing an early warning signal of slick conditions at the at least one other point based upon the calculated values.

2. The process according to claim 1, wherein the process further comprises assigning the meteorological data from at least one measuring station to the at least one virtual station.

3. The process according to claim 1, wherein the process further comprises assigning the meteorological data from a meteorological measuring network, which is independent of the system of early warning.

4. The process according to claim 1, further comprising ascertaining location specific parameters at predetermined automatic measuring stations; and assigning the ascertained parameters to the at least one virtual station as the location specific parameters for the at least one other point.

5. The process according to claim 1, further comprising ascertaining location specific parameters at the at least one virtual station; and assigning the ascertained parameters to the at least one virtual station.

6. The process according to claim 1, wherein the calculated values indicative of slickness of the road surface at the at least one other point include road surface temperature and road surface moisture.

7. The process according to claim 1, further comprising determining a freezing point temperature of liquid present at the at least one virtual station by assuming the freezing point temperature from a predetermined measuring station equipped with a freezing point probe.

8. The process according to claim 1, further comprising determining a freezing point temperature at the at least one virtual station from an amount of melting agent per area unit of road, distributed by a scattering device; and calculating a hydric balance of the road at the at least one virtual station.

9. The process according to claim 1, further comprising ascertaining a quantity representing cloud cover over the at least one measuring point by calculating surface temperatures of the road for various assumed degrees of cloud cover;

comparing the calculated surface temperatures to the measured road surface temperature; and determining the cloud cover from the calculated value which is closest to the measured value.

10. A process for arranging and operating a system for early warning of slick road conditions that includes at least one virtual station in a road system and a plurality of automatic measuring stations with probes arranged at predetermined measuring points in the road system, the process comprising:

virtually positioning the at least one virtual station in a known location in the road system which is different from the predetermined measuring points;

assigning meteorological data from at least a selected one of the plurality of measuring stations to the at least one virtual station;

assigning location specific parameters to the at least one virtual station; and operating the at least one virtual station by combining the meteorological data with the location specific parameters.

11. The process according to claim 10, wherein the position of the at least one virtual station is determined on a basis of a thermographic recording of the road system.

12. The process according to claim 10, wherein the road system further includes another automatic measuring station, and the process further comprising:

positioning the at least one virtual station at a location the another automatic measuring station;

calculating at least one calculated value for the at least one virtual station;

comparing the at least one calculated value with a corresponding measured value of the automatic measuring station;

changing at least one parameter of the virtual station and repeating the calculating and comparing until a difference between the calculated and measured values is less than or equal to a predetermined quantity; and assigning the at least one parameter to another virtual station with at least one of a similar road conditions and a similar position in the road system.

13. The process according to claim 12, wherein the at least one value includes at least one of road surface temperature and road surface moisture.

14. The process according to claim 10, further comprising ascertaining parameters at the known location of the at least one virtual station by a temporary measuring arrangement; and assigning the ascertained parameters to the at least one virtual station.

15. The process according to claim 14, wherein measuring road surface temperature includes detecting latent heat flow in the road, detecting sensory heat flow in the road, and detecting heat conduction within the road, whereby the comparison of the measured and calculated surface temperatures provides an optimized value for the heat related to global radiation and infrared radiation; and the process further comprises determining an amount of cloud cover from the optimized value for the heat.

16. A device for early warning of slick road conditions in a road system comprising:

at least one automatic measuring station with probes located at a predetermined location of the road system;

at least one evaluating device coupled to said at least one automatic measuring station to produce an early warning signal of slick conditions;

at least one virtual station virtually assigned to a location different from said predetermined location and coupled to said at least one evaluating device, which is adapted to provide signals related to slick conditions, said virtual station comprising a data set of location specific parameters for said at least one virtual station, and said at least one evaluating device comprising a calculating unit for combining said data set with meteorological data to determine whether slick road conditions are present at the virtual station location.

17. The device according to claim 16, said evaluating device comprising an assigning device adapted to assign at least one of:

(a) meteorological measured values; and (b) parameters that have been ascertained at the at least one automatic measuring station and transmitted to the evaluating device, to the at least one virtual station.

18. The device according to claim 16, said evaluating device comprising a calculating device adapted for calculating at least one of road surface temperature and road surface moisture of the at least one virtual station based on meteorological data and station parameters.

19. The device according to claim 16, said evaluating device is adapted to at least one of receive and calculate a freezing point temperature for the at least one virtual station.

20. The device according to claim 16, further comprising:

a device for measuring road surface temperature;

a device for calculating road surface temperature as a function of an assumed degree of cloud cover; and a device for comparing the measured road surface temperature with the calculated road surface temperature.

* * * * *